United States Patent
Li

(10) Patent No.: US 6,666,470 B2
(45) Date of Patent: Dec. 23, 2003

(54) STEERING STRUCTURE OF CHILDREN'S TRICYCLE

(76) Inventor: Hsing Li, 17 Yong Hsing Street, North District, Taichung City (TW)

( * ) Notice: Subject to any disclaimer, the term of this patent is extended or adjusted under 35 U.S.C. 154(b) by 0 days.

(21) Appl. No.: 10/045,098

(22) Filed: Jan. 15, 2002

(65) Prior Publication Data

US 2003/0132596 A1 Jul. 17, 2003

(51) Int. Cl.⁷ .................................................. B62B 3/12
(52) U.S. Cl. .......................... 280/282; 280/272; 280/89
(58) Field of Search ................................ 280/272, 774, 280/89, 282, 270, 288.4, 263, 292, 304.5, 293, 62, 47.11

(56) References Cited

U.S. PATENT DOCUMENTS

| | | | | |
|---|---|---|---|---|
| 638,112 A | * | 11/1899 | Graham | |
| 2,816,775 A | * | 12/1957 | Costello | |
| 3,237,961 A | * | 3/1966 | McMullen | |
| 3,485,507 A | * | 12/1969 | Christof | |
| 4,029,329 A | * | 6/1977 | Chambers | 280/87.02 R |
| 4,887,827 A | * | 12/1989 | Heggie | 280/272 |
| D332,591 S | * | 1/1993 | Reely | D12/129 |
| 5,904,363 A | * | 5/1999 | Li | 280/282 |
| 5,924,713 A | * | 7/1999 | Li | 280/270 |
| 6,120,048 A | * | 9/2000 | Li | 280/270 |
| 6,302,421 B1 | * | 10/2001 | Lee | 280/210 |

* cited by examiner

Primary Examiner—Avraham Lerner
(74) Attorney, Agent, or Firm—Rabin & Berdo, P.C.

(57) ABSTRACT

A children's tricycle is formed of a front frame, a rear frame, and a bridging frame connecting the front frame and the rear frame. The bridging frame is fastened with the front frame in conjunction with a connection seat which is provided with a stop projection for confining the rotation of the front frame, thereby preventing the front wheel of the tricycle from being jammed.

2 Claims, 8 Drawing Sheets

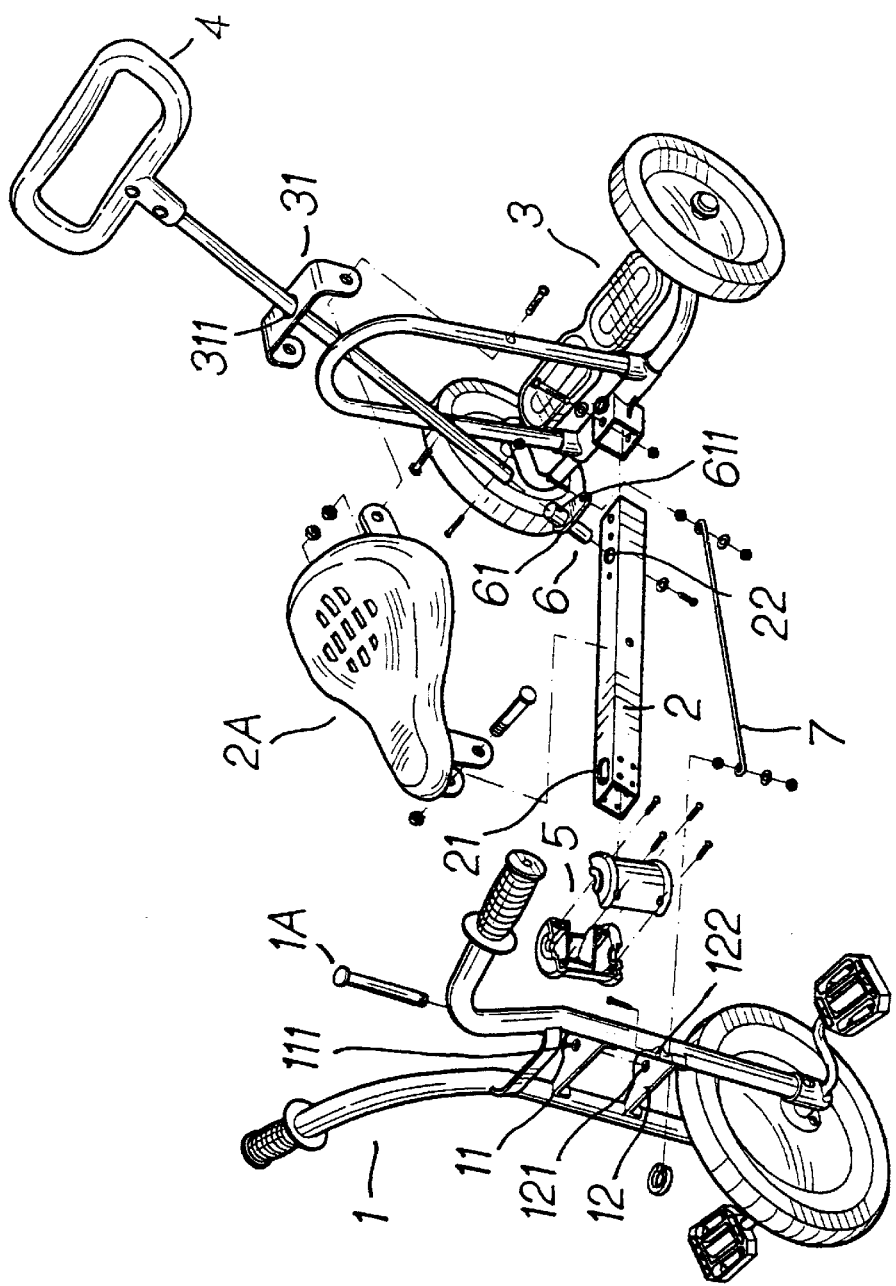
FIG. 2-A

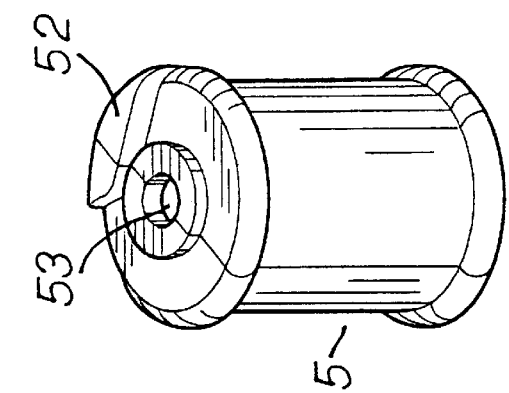
FIG. 2-D
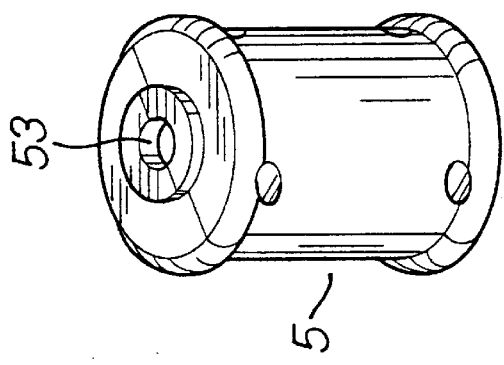
FIG. 2-C
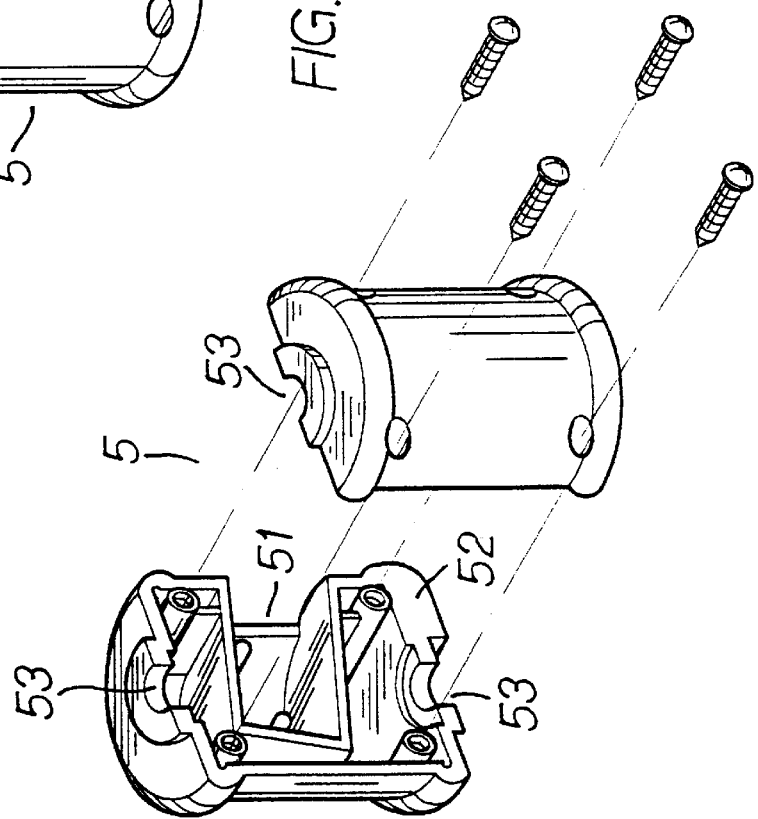
FIG. 2-B

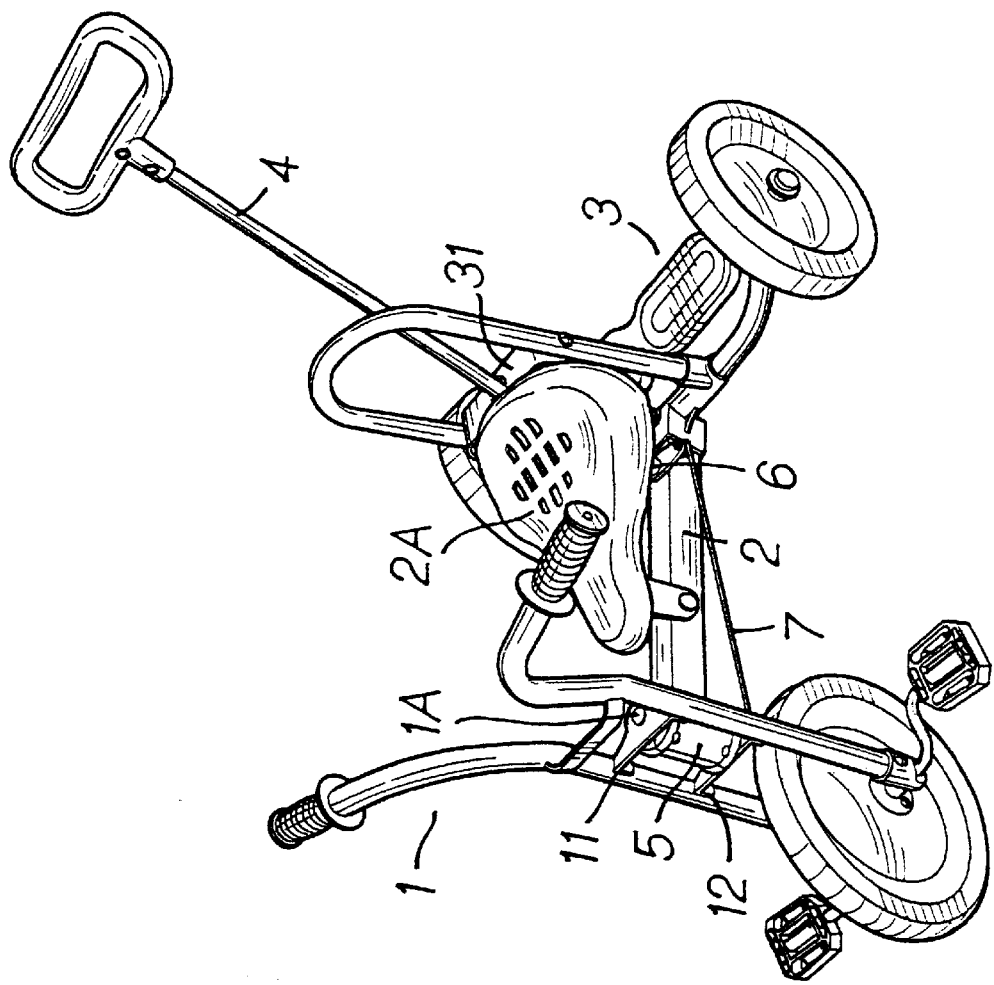
FIG. 3-A

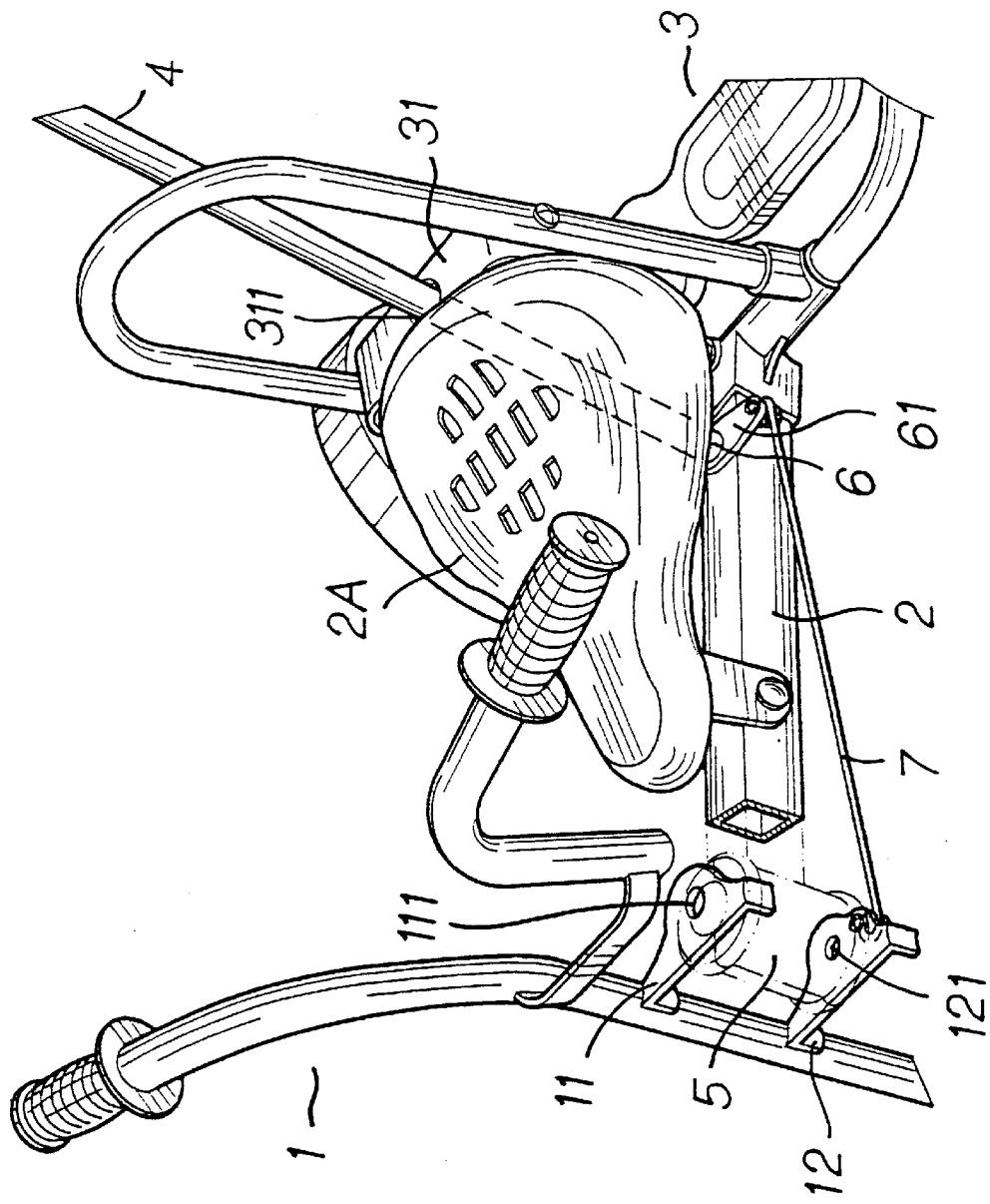
FIG.3-B

STEERING STRUCTURE OF CHILDREN'S TRICYCLE

FIELD OF THE INVENTION

The present invention relates generally to a children's tricycle, and more particularly to a steering structure of the children's tricycle.

BACKGROUND OF THE INVENTION

As shown in FIG. 1, a children's tricycle "A" of the prior art comprises two handlebars A1, a rear frame A2, and a connection frame A3 for connecting the handlebar A1 and the rear frame A2 by welding. The rear frame A2 has a support tube A21 which is provided with two seats A22 for mounting a rail A4 by welding.

In operation, the tricycle "A" is moved forward by an adult who pushes the tricycle "A" behind the rear frame A2. The steering of the tricycle "A" in motion is done by a child who is seated on the tricycle, with both hands holding the handlebars A1. The front wheel of the tricycle "A" is apt to jam when the handlebars A1 are turned improperly or excessively, thereby resulting in overturning of the tricycle. In addition, it is tiresome for an adult to push the tricycle for a prolonged period of time. The steering structure of the prior art tricycle is rather primitive at best and is prone to accidents.

SUMMARY OF THE INVENTION

The primary objective of the present invention is to provide a children's tricycle with a steering structure which is intended to overcome the deficiencies of the prior art steering structure described above.

In keeping with the principle of the present invention, the foregoing objective of the present invention is attained by a children's tricycle comprising a front frame, a bridging frame, a rear frame, and an auxiliary steering rod. The front frame is fastened with the front end of the bridging frame in conjunction with a connection seat, so as to prevent the front wheel of the tricycle from being jammed.

The features and the advantages of the present invention will be more readily understood upon a thoughtful deliberation of the following detailed description of the present invention with reference to the accompanying drawings.

BRIEF DESCRIPTION OF THE DRAWINGS

FIG. 2-A shows an exploded view of a children's tricycle of the present invention.

FIG. 2-B shows an exploded view of the connection seat of the present invention.

FIG. 2-C shows a perspective view of the connection seat of the present invention in combination.

FIG. 2-D shows a perspective view of the inverted connection seat of the present invention in combination FIG. 3-A shows a perspective view of the tricycle of the present invention FIG. 3-B shows a partial schematic view of the tricycle of the present invention

DETAILED DESCRIPTION OF THE INVENTION

Figure 1:
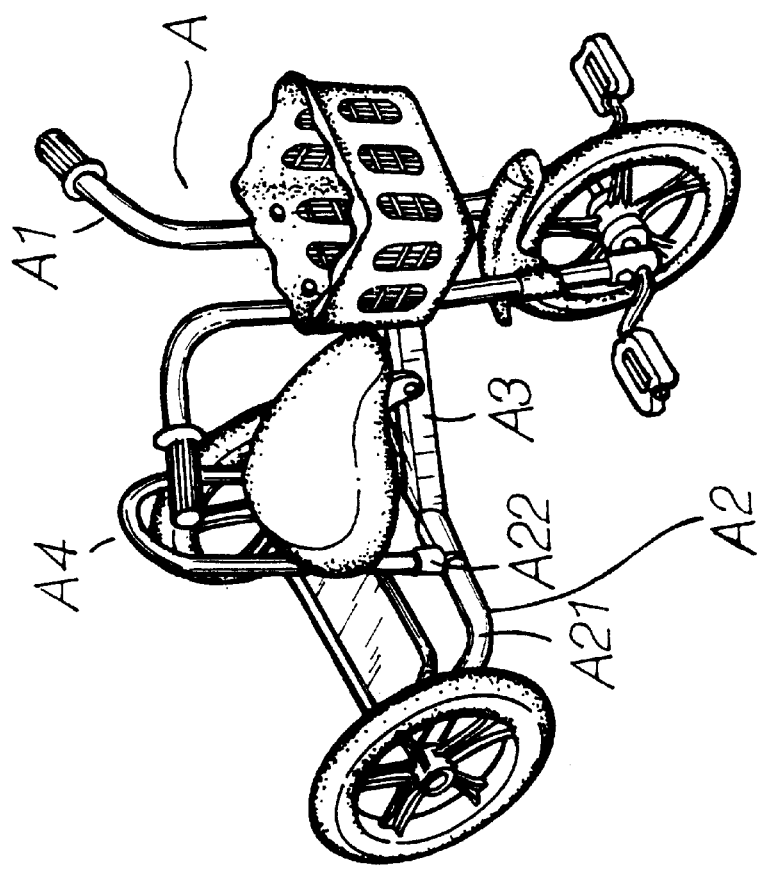
FIG. 1 shows a perspective view of a children's tricycle of the prior art.
Figure 4:
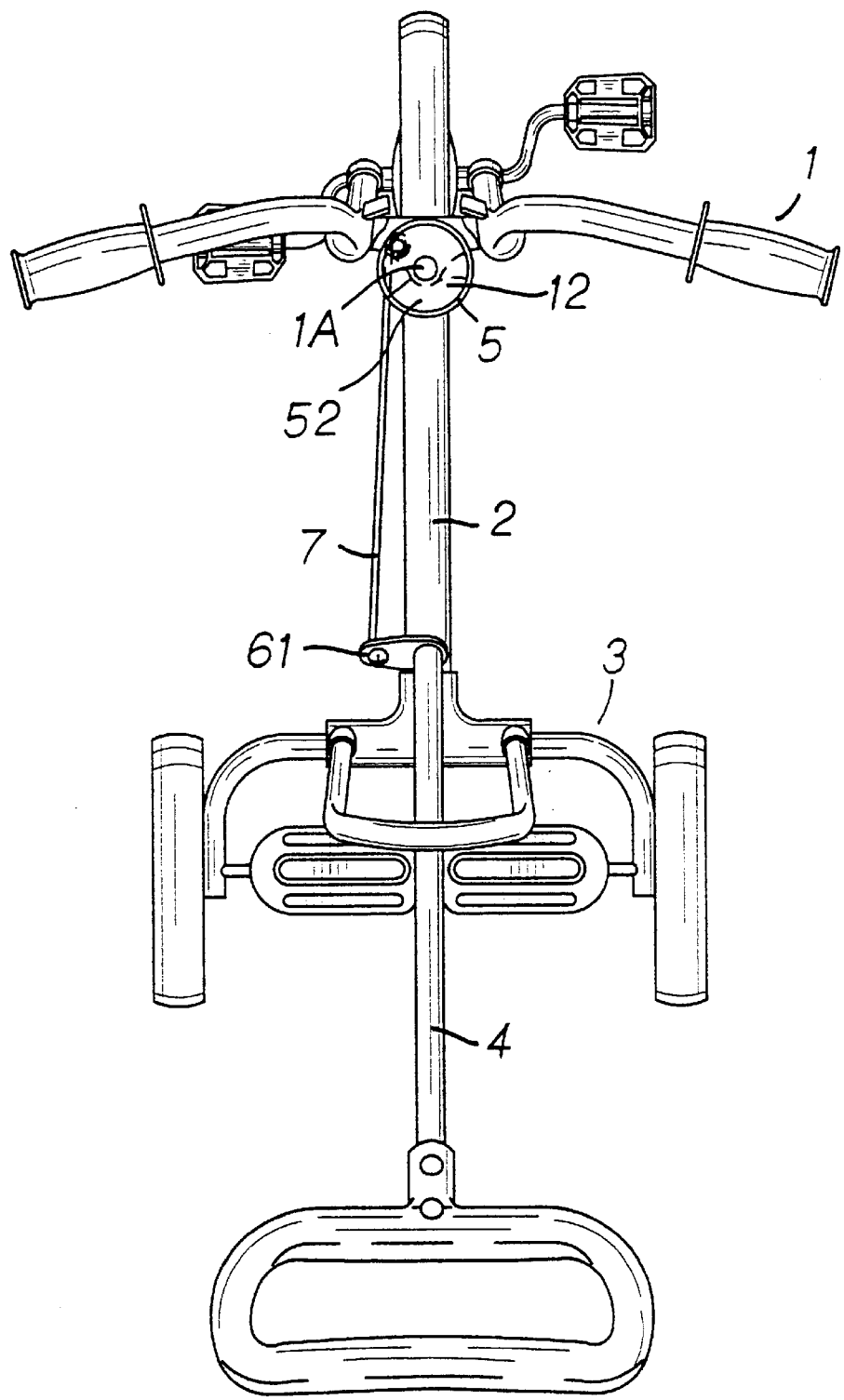
FIG. 4 shows a schematic view of the tricycle of the present invention in straightforward motion.

As shown in FIGS. 2–6, a children's tricycle of the present invention comprises a front frame 1, a bridging frame 2, a rear frame 3, and an auxiliary steering rod 4. A seat 2A is mounted on the bridging frame 2.

The front frame 1 is formed of an upper seat 11 and a lower seat 12. The upper seat 11 is provided with a hole 111. The lower seat 12 is provided with a hole 121. The lower seat 12 is provided with a round hole 122.

The bridging frame 2 is provided at the front end with a through hole 21, and at the rear end with a through hole 22. The front end of the bridging frame 2 is fastened with the front frame 1 by a connection seat 5 of a cylindrical construction. The connection seat 5 is provided with an insertion slot 51, a stop projection 52, and an upright through hole 53. The connection seat 5 is fastened with the bridging frame 2 and the front frame 1 such that the front end of the bridging frame 2 is inserted into the insertion slot 51 of the connection seat 5, and that the connection seat 5 is fastened between the upper seat 11 and the lower seat 12 of the front frame 1 by a fastening bolt 1A which is put through the hole 111 of the upper seat 11, the hole 121 of the lower seat 12, the through hole 21 of the front end of the bridging frame 2, and the upright through hole 53 of the connection seat 5.

The rear frame 3 is fastened with the rear end of the bridging member 2 in conjunction with a connector 6 which is provided with a connection piece 61 having a round hole 611. The connector 6 is fastened with the rear through hole 22 of the bridging member 2 in conjunction with a connection rod 7, which is fastened at one end with the round hole 122 of the lower seat 12, and at other end with the round hole 611 of the connector 6.

The auxiliary steering rod 4 is provided with bracing piece 31 which is provided with a center through hole 311. The lower end of the auxiliary steering rod 4 is fastened with the connector 6 such that the bracing piece 31 is fastened with the seat 2A. The auxiliary steering rod 4 is used by an adult to push the tricycle to move forward.

It must be noted here that the lower seat 12 is provided with a semicircular projection, which is arrested by the stop projection 52 of the connection seat 5 at the time when the front frame 1 is turned excessively, thereby preventing the front wheel of the tricycle from being jammed.

Figure 5:
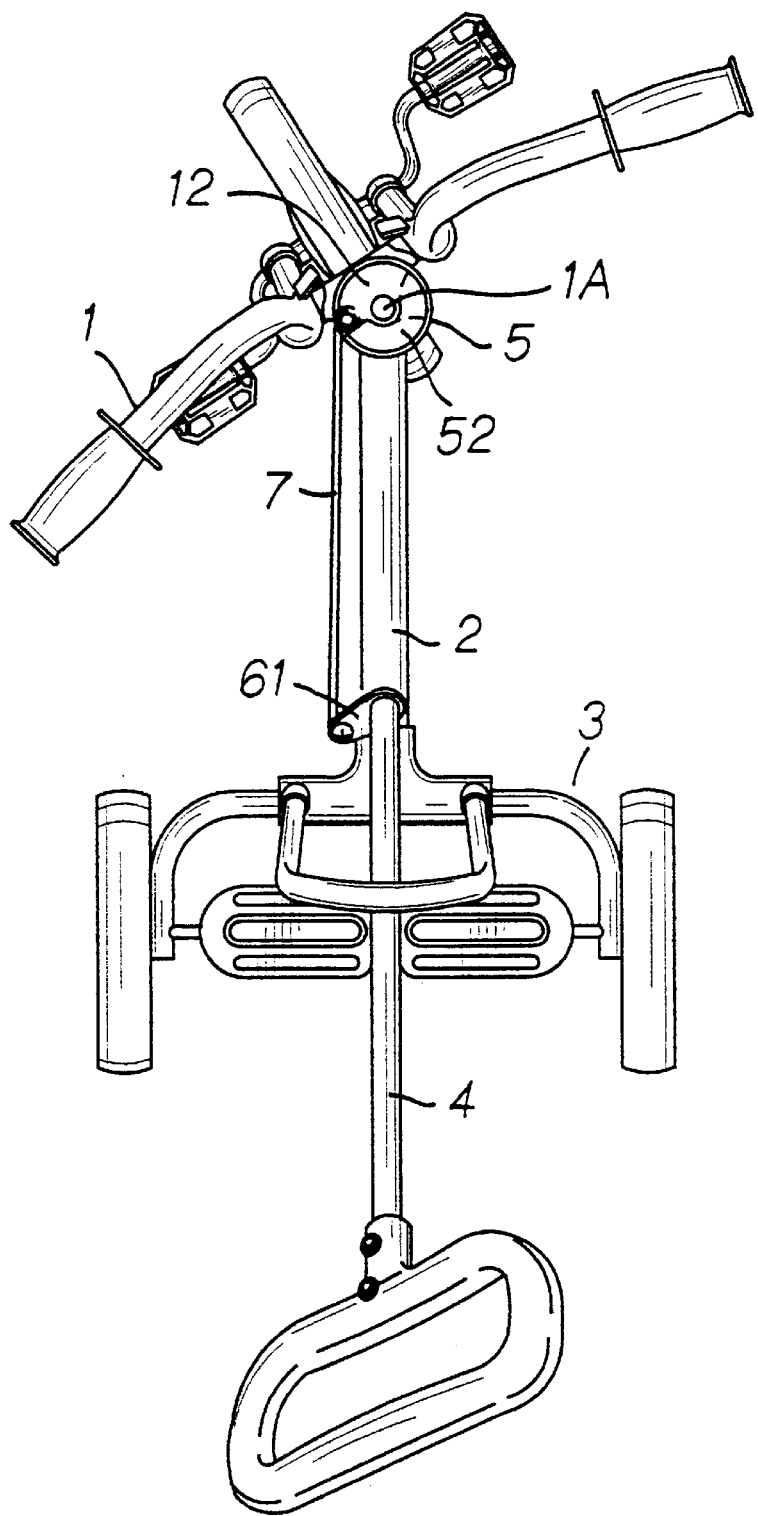
FIG. 5 shows a schematic view of the tricycle of the present invention in the midst of making a left turn.
Figure 6:
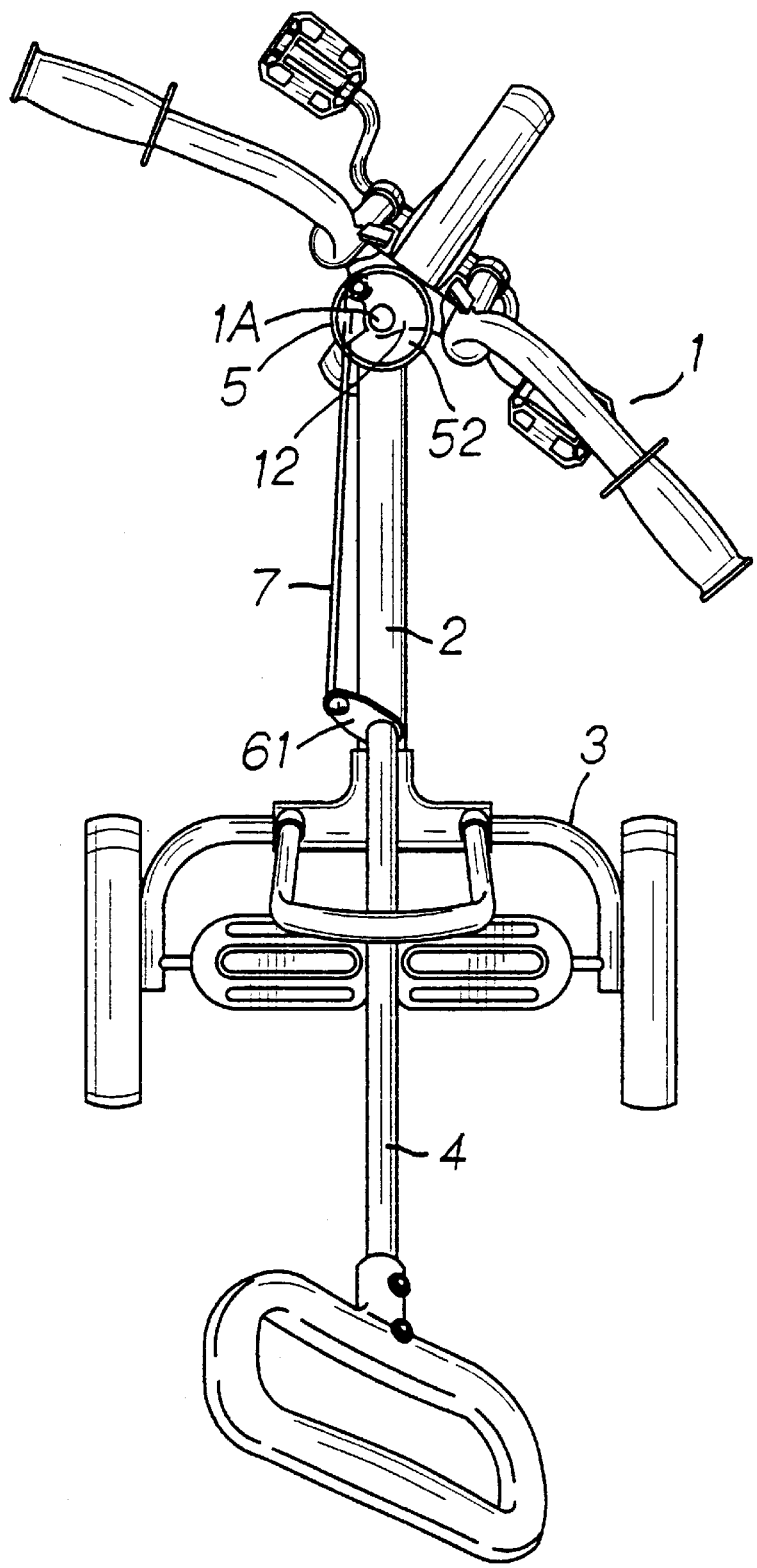
FIG. 6 shows a schematic view of the tricycle of the present invention in the midst of making a right turn.

As illustrated in FIGS. 5 and 6, when the auxiliary steering rod 4 is turned, the connector 6 is turned accordingly. In view of the fact that the connector 6 is linked with the lower seat 12 of the front frame 1, the front frame 1 is turned in a direction in which the auxiliary steering rod 4 was turned.

The present invention described above is to be regarded in all respects as being illustrative and nonrestrictive. Accordingly, the present invention may be embodied in other specific forms without deviating from the spirit thereof. The present invention is therefore to be limited only by the scope of the following claim.

What is claimed is:

1. A children's tricycle, comprising:

a front frame formed of an upper seat and a lower seat, said upper seat and said lower seat being arranged at an interval and provided with a through hole;

a bridging frame provided at a front end with a fastening hole and at a rear end with a through hole, said bridging frame being fastened at the front end with said front frame by a fastening bolt which is put through said through hole of said upper seat, said fastening hole of said bridging frame, and said through hole of said lower seat;

a rear frame fastened with the rear end of said bridging frame in conjunction with a connector; and an auxiliary steering rod fastened at a lower end with said connector;

wherein said bridging frame is fastened at the front end with said front frame in conjunction with a connection seat, said connection seat being of a cylindrical construction and being provided with an insertion slot, a stop projection, and an upright hole, whereby said connection seat is fastened with said bridging frame and said front frame such that the front end of said bridging frame is inserted into said insertion slot of said connection seat, and that said connection seat is fastened between said upper seat and said lower seat of said front frame by said fastening bolt which is put through said through hole of said upper seat, said through hole of said lower seat, said fastening hole of the front end of said bridging frame, and said upright hole of said connection seat, and further that said stop projection of said connection seat confines the rotation of a semicircular projection of said lower seat of said front frame;

wherein said connector is linked with said lower seat of said front frame by a connection rod whereby said connection rod is fastened at one end with said lower seat, and at other end with said connector.

2. A children's tricycle, comprising:

a front frame having an upper seat and a lower seat, said upper seat and said lower seat being spaced from each other, and each being provided with a through hole, at least one of said upper seat and said lower seat having a semicircular projection formed thereon;

a front wheel attached to said front frame;

a rear frame;

two rear wheels, each being attached to said rear frame;

a bridging frame extending between and being connected to said front frame and said rear frame, a front end of said bridging frame having a fastening hole formed therein;

a cylindrical connection member connecting said bridging frame to said front frame, and having a stop projection, a vertical through hole, and an insertion slot, the front end of said bridging frame being received within the insertion slot, said connection member being positioned between said upper seat and said lower seat, with the through hole of said connection member being disposed in alignment with the fastening hole of said bridging frame and with the through holes of said upper seat and said lower seat; and a fastening bolt that extends through the upper seat, said connection member, said bridging frame and said lower seat, respectively, by way of the respective through holes and the fastening hole, to fasten said front frame to said bridging frame and to allow said front frame and said front wheel to rotate relative to rear frame and said rear wheels, the rotation of said front frame being arrested by an abutment of said stop projection with the semicircular projection.

* * * * *